United States Patent
Clayton (10) Patent No.: US 9,906,840 B2
(45) Date of Patent: *Feb. 27, 2018

(54) SYSTEM AND METHOD FOR OBTAINING INFORMATION RELATING TO VIDEO IMAGES

(71) Applicant: Google Inc., Mountain View, CA (US)

(72) Inventor: Nik Clayton, Zurich (CH)

(73) Assignee: Google LLC, Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/284,145

(22) Filed: Oct. 3, 2016

(65) Prior Publication Data
US 2017/0026708 A1  Jan. 26, 2017

Related U.S. Application Data

(63) Continuation of application No. 14/966,955, filed on Dec. 11, 2015, now Pat. No. 9,462,350, which is a
(Continued)

(51) Int. Cl.
*H04N 21/4722* (2011.01)
*H04N 21/482* (2011.01)
(Continued)

(52) U.S. Cl.
CPC ..... *H04N 21/4828* (2013.01); *G06F 17/3079* (2013.01); *G06K 9/00442* (2013.01); *G06K 9/00718* (2013.01); *G06K 9/6215* (2013.01); *H04N 21/2393* (2013.01); *H04N 21/23418* (2013.01); *H04N 21/42204* (2013.01); *H04N 21/43* (2013.01); *H04N 21/431* (2013.01); *H04N 21/4334* (2013.01); *H04N 21/4722* (2013.01); *H04N 21/4725* (2013.01);
(Continued)

(58) Field of Classification Search
CPC ........... H04N 21/4722; H04N 21/4725; H04N 21/43; H04N 21/431
See application file for complete search history.

(56) References Cited

U.S. PATENT DOCUMENTS 7,840,980 B2  11/2010  Gutta
8,064,516 B2  11/2011  Kojokaro et al.
(Continued)

FOREIGN PATENT DOCUMENTS

| EP | 2388721 | 11/2011 |
|---|---|---|
| WO | WO/2012/014130 | 2/2012 |
| WO | WO/2013/040533 | 3/2013 |

OTHER PUBLICATIONS

Office Action dated Oct. 19, 2016 in U.S. Appl. No. 13/834,394.
(Continued)

*Primary Examiner* — Robert Hance
(74) *Attorney, Agent, or Firm* — Byrne Poh LLP (57) ABSTRACT

A system and method is provided where, in one aspect, a user signals that the user is interested in a particular image being displayed as part of a video, wherein objects in the image are detected and recognized, and wherein an action is taken based on information associated with the recognized objects. By way of example only, the actions may include recording a show (with or without a user's prior confirmation) or displaying information about a product in the image.

24 Claims, 4 Drawing Sheets

Related U.S. Application Data continuation of application No. 13/801,843, filed on Mar. 13, 2013, now Pat. No. 9,258,597.

(51) Int. Cl.

| | | |
|---|---|---|
| *H04N 21/4725* | (2011.01) | |
| *H04N 21/234* | (2011.01) | |
| *H04N 21/239* | (2011.01) | |
| *H04N 21/433* | (2011.01) | |
| *H04N 21/472* | (2011.01) | |
| *H04N 21/6543* | (2011.01) | |
| *H04N 21/658* | (2011.01) | |
| *G06F 17/30* | (2006.01) | |
| *G06K 9/00* | (2006.01) | |
| *G06K 9/62* | (2006.01) | |
| *H04N 21/422* | (2011.01) | |
| *H04N 21/43* | (2011.01) | |
| *H04N 21/431* | (2011.01) | |
| *H04N 21/4782* | (2011.01) | |
| *H04N 21/488* | (2011.01) | |
| *H04N 21/84* | (2011.01) | |
| *H04N 21/858* | (2011.01) | |

(52) U.S. Cl.
CPC ... *H04N 21/4782* (2013.01); *H04N 21/47214* (2013.01); *H04N 21/4882* (2013.01); *H04N 21/6543* (2013.01); *H04N 21/6582* (2013.01); *H04N 21/84* (2013.01); *H04N 21/8586* (2013.01)

(56) References Cited

U.S. PATENT DOCUMENTS

| | | | |
|---|---|---|---|
| 8,185,543 B1 | 5/2012 | Choudhry et al. | |
| 8,205,223 B2 | 6/2012 | Pack et al. | |
| 8,392,951 B2 | 3/2013 | Park et al. | |
| 8,484,017 B1 | 7/2013 | Sharifi et al. | |
| 8,694,533 B2 | 4/2014 | Oztaskent et al. | |
| 8,929,657 B2* | 1/2015 | Jung | G06F 17/30855 382/164 |
| 2002/0147984 A1 | 10/2002 | Tomsen et al. | |
| 2004/0104926 A1 | 6/2004 | Murray et al. | |
| 2006/0129908 A1 | 6/2006 | Markel | |
| 2007/0124756 A1 | 5/2007 | Covell et al. | |
| 2007/0136773 A1* | 6/2007 | O'Neil | H04N 7/17318 725/100 |
| 2008/0089551 A1* | 4/2008 | Heather | H04N 21/235 382/100 |
| 2008/0098432 A1 | 4/2008 | Hardacker et al. | |
| 2008/0226119 A1 | 9/2008 | Candelore et al. | |
| 2008/0229363 A1* | 9/2008 | Lanfermann | H04N 7/17318 725/47 |
| 2009/0276805 A1* | 11/2009 | Andrews, II | G06Q 30/02 725/35 |
| 2010/0082585 A1 | 4/2010 | Barsook et al. | |
| 2010/0121973 A1 | 5/2010 | Lobacheva et al. | |
| 2010/0287053 A1 | 11/2010 | Ganong et al. | |
| 2011/0078753 A1 | 3/2011 | Christianson et al. | |
| 2011/0103763 A1 | 5/2011 | Tse et al. | |
| 2011/0125735 A1 | 5/2011 | Petrou | |
| 2011/0179357 A1 | 7/2011 | Lin et al. | |
| 2011/0243449 A1 | 10/2011 | Hannuksela et al. | |
| 2011/0246495 A1 | 10/2011 | Mallinson | |
| 2011/0247042 A1 | 10/2011 | Mallinson | |
| 2011/0282906 A1* | 11/2011 | Wong | G06F 17/30831 707/780 |
| 2012/0078889 A1 | 3/2012 | Chu-Carroll et al. | |
| 2012/0096499 A1 | 4/2012 | Dasher et al. | |
| 2012/0117057 A1 | 5/2012 | Adimatyam et al. | |
| 2012/0117584 A1* | 5/2012 | Gordon | H04N 21/254 725/19 |
| 2012/0167144 A1* | 6/2012 | Avison-Fell | H04N 21/8586 725/51 |
| 2012/0227074 A1 | 9/2012 | Hill et al. | |
| 2012/0240144 A1 | 9/2012 | Rose | |
| 2012/0266197 A1* | 10/2012 | Andrews, II | G06Q 30/02 725/60 |
| 2012/0291072 A1 | 11/2012 | Maddison et al. | |
| 2012/0311623 A1 | 12/2012 | Davis et al. | |
| 2012/0311641 A1 | 12/2012 | Allard | |
| 2013/0036442 A1 | 2/2013 | Wingert | |
| 2013/0047178 A1 | 2/2013 | Moon et al. | |
| 2013/0058522 A1 | 3/2013 | Raesig et al. | |
| 2013/0086105 A1 | 4/2013 | Hammontree et al. | |
| 2013/0104172 A1 | 4/2013 | Lee et al. | |
| 2013/0111514 A1 | 5/2013 | Slavin et al. | |
| 2013/0139209 A1 | 5/2013 | Urrabazo et al. | |
| 2013/0174195 A1* | 7/2013 | Witenstein-Weaver | H04N 21/4722 725/32 |
| 2013/0179436 A1 | 7/2013 | Yun et al. | |
| 2014/0253472 A1* | 9/2014 | Ayoub | G06F 17/30277 345/173 |
| 2014/0255003 A1* | 9/2014 | Abramson | G06F 17/30247 386/240 |
| 2015/0193433 A1 | 7/2015 | Dykeman et al. | |

OTHER PUBLICATIONS

Office Action dated Oct. 20, 2016 in U.S. Appl. No. 14/191,034.
International Preliminary Report on Patentability and Written Opinion dated Jul. 14, 2016 in International Patent Application No. PCT/US2014/072258.
International Preliminary Report on Patentability and Written Opinion dated Sep. 24, 2015 in International Patent Application PCT/US2014/024627.
International Preliminary Report on Patentability dated Sep. 24, 2015 in International Patent Application No. PCT/US2014/024255.
International Search Report and Written Opinion of the International Search Authority dated Jul. 28, 2014 in International Patent Application No. PCT/US2014/024255.
International Search Report and Written Opinion of the International Search Authority dated Apr. 17, 2015 in International Patent Application No. PCT/US2014/072258.
International Search Report and Written Opinion of the International Search Authority dated Jul. 24, 2014 in International Patent Application No. PCT/US2014/024627.
Notice of Allowance dated Apr. 17, 2015 in U.S. Appl. No. 13/827,413.
Notice of Allowance dated Jun. 5, 2015 in U.S. Appl. No. 13/826,910.
Notice of Allowance dated Aug. 17, 2015 in U.S. Appl. No. 13/801,843.
Office Action dated Jan. 5, 2016 in U.S. Appl. No. 13/826,910.
Office Action dated Jan. 30, 2015 in U.S. Appl. No. 13/826,910.
Office Action dated Mar. 9, 2016 in U.S. Appl. No. 14/966,955.
Office Action dated Mar. 23, 2015 in U.S. Appl. No. 13/801,843.
Office Action dated Mar. 25, 2015 in U.S. Appl. No. 13/834,394.
Office Action dated May 12, 2016 in U.S. Appl. No. 13/834,394.
Office Action dated May 18, 2016 in U.S. Appl. No. 13/826,910.
Office Action dated Jun. 6, 2016 in U.S. Appl. No. 14/966,955.
Office Action dated Jul. 14, 2016 in U.S. Appl. No. 14/191,034.
Office Action dated Jul. 27, 2016 in U.S. Appl. No. 15/005,470.
Office Action dated Jul. 29, 2014 in U.S. Appl. No. 13/826,910.
Office Action dated Sep. 11, 2015 in U.S. Appl. No. 13/834,394.
Office Action dated Dec. 9, 2014 in U.S. Appl. No. 13/827,413.
Office Action dated Dec. 11, 2015 in U.S. Appl. No. 14/966,955.
U.S. Appl. No. 13/594,693, filed Aug. 24, 2012.
U.S. Appl. No. 13/826,910, filed Mar. 14, 2013.
U.S. Appl. No. 13/827,413, filed Mar. 14, 2013.
U.S. Appl. No. 14/191,034, filed Feb. 26, 2014.
U.S. Appl. No. 61/922,218, filed Dec. 31, 2013.
YouTube, "Pharos Demonstration—Audiovisual Tunable Search—Part C", last updated Jan. 16, 2010, pp. 1, available at: https://www.youtube.com/watch?v=ZpxyNi6Ht50.
Office Action dated Jun. 2, 2017 in U.S. Appl. No. 14/191,034.

(56) References Cited

OTHER PUBLICATIONS

Office Action dated Apr. 24, 2014 in U.S. Appl. No. 13/801,843.
Office Action dated Apr. 13, 2017 in EP Patent Application No. 14725797.6.
Notice of Allowance dated Mar. 9, 2017 in U.S. Appl. No. 13/834,394.
Notice of Allowance dated Jun. 6, 2016 in U.S. Appl. No. 14/966,955.
Notice of Allowance dated Nov. 9, 2016 in U.S. Appl. No. 15/005,470.
Office Action dated Jun. 29, 2017 in U.S. Appl. No. 15/431,431.
Office Action dated Sep. 6, 2017 in U.S. Appl. No. 14/191,034.
Office Action dated Sep. 27, 2017 in U.S. Appl. No. 15/431,431.

* cited by examiner

SYSTEM AND METHOD FOR OBTAINING INFORMATION RELATING TO VIDEO IMAGES

CROSS-REFERENCE TO RELATED APPLICATIONS

This application is a continuation of U.S. patent application Ser. No. 14/966,955, filed Dec. 11, 2015, which is a continuation of U.S. patent application Ser. No. 13/801,843, filed Mar. 13, 2013, which are hereby incorporated by reference herein in their entireties.

TECHNICAL FIELD

Systems and methods for obtaining information relating to video images are provided.

BACKGROUND

Typical set top boxes are capable of displaying videos, such as but not limited to television shows. The videos may be obtained from various sources, such as receiving streaming video from a cable television company over a cable network, and such as downloading a video from a website for later viewing by wirelessly connecting to the Internet. Set top boxes often have relatively rudimentary search tools, such as allowing users to enter text for the purpose of finding and recording upcoming television shows.

This can be contrasted with Internet-based search engines that may permit personal computers and the like to obtain different types of search results (e.g., links to web pages and images) and accommodate different data formats for queries (e.g., text queries and images captured by a cell phone camera).

SUMMARY

In accordance with various implementations of the disclosed subject matter, mechanisms for obtaining information relating to video images are provided.

In accordance with some implementations of the disclosed subject matter, a method is provided, the method comprising: receiving, from a remote device, image data representing an image from a video; identifying, using a processor, first data relating to an object captured in the image based on the visual characteristics of the object appearing in the image, wherein the first data comprises data that was not received from the remote device; determining, using a processor, an action to be performed by the remote device based on the first data; and transmitting, to the remote device, the action to be performed by the remote device.

In accordance with some implementations of the disclosed subject matter, a device is provided, the device comprising: a processor; a video output structured to output video to a display; a memory containing instructions executable by the processor; and a user interface; wherein the instructions comprise: providing video via the video output; receiving a request from the user interface indicating that a user is interested in an object appearing in the video; receiving an action to be taken by the device in response to the request, wherein the action is determined based on the visual characteristics of the image displayed to the user; and performing the action.

In accordance with some implementations of the disclosed subject matter, a system is provided, the system comprising: means for receiving, from a remote device, image data representing an image from a video; means for identifying first data relating to an object captured in the image based on the visual characteristics of the object appearing in the image, wherein the first data comprises data that was not received from the remote device; means for determining an action to be performed by the remote device based on the first data; and means for transmitting the action to be performed by the remote device.

In some implementations, the remote device is a set top box.

In some implementations, the first data comprises an identification of a second video different than the video containing the image, wherein visual characteristics of the object are visually similar to the visual characteristics of an object associated with the second video, and wherein the action comprises receiving the second video at the remote device.

In some implementations, the second video is a television show and the action comprises recording the show at the remote device.

In some implementations, the visual characteristics comprise the visual characteristics of a person appearing in both videos.

In some implementations, the visual characteristics comprise text captured in the image, and wherein identifying the first data comprises using character recognition to identify the characters of the text, and wherein the first data is retrieved based on a query including the characters.

In some implementations, the means for identifying the first data comprises means for identifying other images that are visually similar to the image received from the remote device, wherein the other images are associated with metadata, and wherein the first data is retrieved based on the metadata.

In some implementations, the other images comprise reference images of objects and the metadata comprises the name of the object.

In some implementations, the action comprises displaying a webpage related to the object.

In some implementations, the action comprises transmitting the URL of a webpage to be retrieved by the remote device.

In some implementations, the first data is used to form a query, and wherein the action is determined based on the type of a search result returned in response to the query.

In some implementations, the action comprises displaying a web page when the type of search result identifies a webpage, and wherein the action comprises receiving a video when the type of search result identifies a video that is or will be accessible to the remote device.

In accordance with some implementations of the disclosed subject matter, a method is provided, the method comprising: displaying a first video to a user; receiving a signal from a user interface; identifying an image contained in the first video based on the signal from the user interface; transmitting an identification of the image to a device over a network; receiving an identification of a second video based on the identification of the image; and displaying the second video.

In accordance with some implementations of the disclosed subject matter, a system is provided, the system comprising: means for displaying a first video to a user; means for receiving a signal from a user interface; means for identifying an image contained in the first video based on the signal from the user interface; means for transmitting an identification of the image to a device over a network; means for receiving an identification of a second video based on the identification of the image; and means for displaying the second video.

In some implementations, the means for transmitting an identification of the image comprises means for transmitting pixel data representing the image.

In some implementations, the second video is identified based on the image's visual similarity with other images, wherein non-image information that is associated with visually similar images is retrieved, and wherein the second video is identified based on the non-image information.

BRIEF DESCRIPTION OF THE DRAWINGS

Various objects, features, and advantages of the disclosed subject matter can be more fully appreciated with reference to the following detailed description of the disclosed subject matter when considered in connection with the following drawing, in which like reference numerals identify like elements.

DETAILED DESCRIPTION

Mechanisms (which may include systems, methods, and media) for obtaining information relating to video images are provided.

In one aspect of the system and method, a set top box permits users to obtain more information about an image in a video they are watching. By way of example, if the user is watching a movie, the user may freeze the movie on a frame that shows an actor they find interesting and press a button to obtain more information. By way of further example, if the user is watching a commercial, the user may press a button when a picture of the product is being displayed.

In both examples, the image may be transmitted to a server and the server may execute a query based on the image data. The server may then transmit, in return, information about the image and suggest that the set top box perform a certain action based on the results of the query. Using the foregoing example of the actor, the server may send a list of upcoming shows starring the actor to the set top box (or send the actor's name for the set top box to search itself), and the set top box may record the shows in response. Using the foregoing example of the product, the server may suggest that the set top box download and display a webpage that the server selected as being of likely greatest interest to the user. In either case, the system and method may permit the set top box to perform an action of interest to the user based solely—from the user's perspective—an indication that the user sees something of interest in that particular frame of the video.

Figure 1:
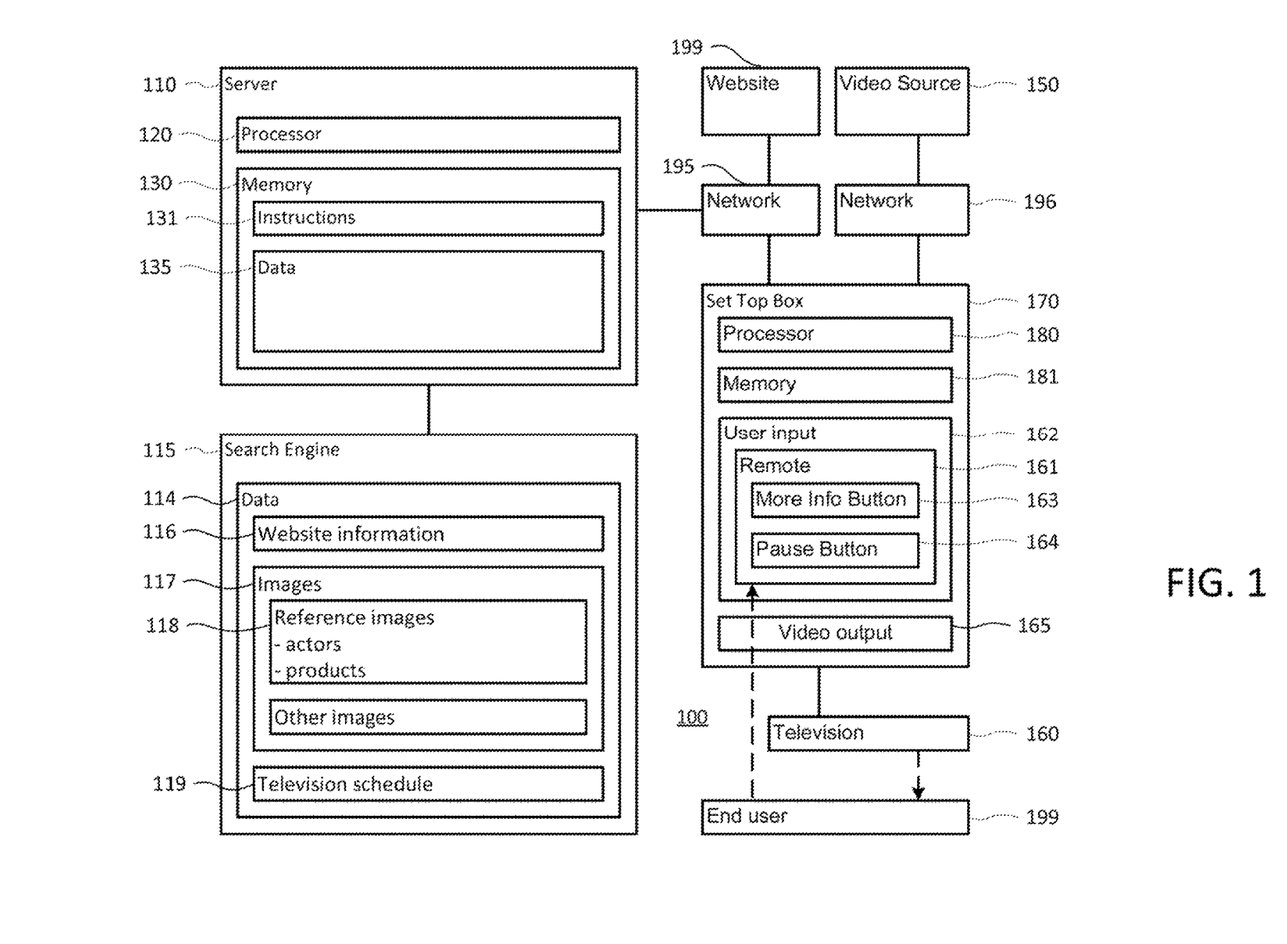
FIG. 1 is a functional diagram of a system for obtaining information relating to video images in accordance with some implementations of the disclosed subject matter.

Turning to FIG. 1, system 100 may comprise a device or collection of devices, such as but not limited to a server 110 containing a processor 120, memory 130 and other components typically present in general purpose computers, and a set top box 170 which also includes processor 180, memory 181 and other components typically present in set top boxes.

Memory 130 stores information accessible by processor 120, including instructions 131 and data 135 that may be executed or otherwise used by the processor 120. The memory 130 may be of any type capable of storing information accessible by the processor, including a computer-readable medium or other medium that stores data that may be read with the aid of an electronic device, such as ROM, RAM, a magnetic or solid-state based hard-drive, a memory card, a DVD or other optical disks, as well as other volatile and non-volatile write-capable and read-only memories. Systems and methods may include different combinations of the foregoing, whereby different portions of the instructions and data are stored in different locations on different types of media.

The instructions 131 may be any set of instructions to be executed directly (such as object code) or indirectly (such as scripts or collections of independent source code modules interpreted on demand) by the processor. For example, the instructions may be stored as computer code on a computer-readable medium. In that regard, the terms "instructions," "programs" and "applications" may be used interchangeably herein. Functions, methods and routines of the instructions are explained in more detail below.

The data 135 may be retrieved, stored or modified by processor 120 in accordance with the instructions 131. For instance, although the system and method is not limited by any particular data structure, the data may be stored in computer registers, in a relational database as a table having a plurality of different fields and records, XML documents or flat files. The data may also be formatted in any computer-readable format. By further way of example only, image data may be stored as bitmaps comprised of grids of pixels that are stored in accordance with formats that are compressed or uncompressed, lossless (e.g., BMP) or lossy (e.g., JPEG), and bitmap or vector-based (e.g., SVG), as well as computer instructions for drawing graphics. The data may comprise any information sufficient to identify the relevant information, such as numbers, descriptive text, proprietary codes, references to data stored in other areas of the same memory or different memories (including other network locations) or information that is used by a function to calculate the relevant data.

The processor 120 may be any conventional processor, such as processors from Intel Corporation or Advanced Micro Devices. Alternatively, the processor may be a dedicated device such as an ASIC. Although FIG. 1 functionally illustrates the processor, memory, and other elements as being within the same block, those of ordinary skill in the art will understand that the processor and memory may actually comprise multiple processors and memories that may or may not be stored within the same physical housing. For example, rather than being stored in the same computer, processor 120 and memory 130 may be stored in separate servers or have various portions distributed among many servers.

The server 110 may be at one node of a network 195 and capable of directly and indirectly communicating with other nodes of the network such as client device 170. Network 195 and the server's communication with other devices, including computers, connected to the network may comprise and use various configurations and protocols including cellular networks (e.g., 4G LTE), other wireless networks (e.g., WiFi), the Internet, intranets, virtual private networks, local Ethernet networks, private networks using communication protocols proprietary to one or more companies, instant messaging, HTTP and SMTP, and various combinations of the foregoing. Although only a few devices are depicted in FIG. 1, a typical system can include a large number of connected devices. Server 110 may also be structured to transmit queries to, and processing search results received from, search engine 115.

Set top box 170 may be similarly configured as described above in connection with server 110, e.g., it may include a processor 180 and memory 181. An end user 199 may communicate with set top box 170 via user interface 162, e.g., a remote control 161 that wirelessly transmits signals representing commands to the set top box. The system and method is not limited to any particular user interface.

The set top box may include a video output 165 that provides image data to be shown on an electronic display, e.g., television 160, a small LCD touch-screen, a monitor having a screen, a projector or any other electrical device that is operable to display information. In that regard, user 199 may control what is shown on television 160 by interacting with set top box 170. Set top box 170 may also include a network interface device for communicating with server 110 via network 195. In that regard, server 110 may display information to end user 199 on television 160 via network 195 and set top box 170. Set top box 170 may also include all of the components typically used in a set top box and connecting its various elements to one another.

Set top box 170 may receive video data from a video source for display to end users. For example, video source 150 may be a cable television head-end that distributes high-definition digital television video signals over local, wired cable television network 196 to set top box 170. The system and method, however, may accommodate a variety of image formats and delivery options. For instance, video source 150 may broadcast conventional analog video signals over the airwaves, which are then processed by the set top box. Source 150 may also send a sequence of bitmapped images in a proprietary format, or instructions for the rendering and animation of vector-based objects, over the same network 195 as server 110, e.g., the Internet.

The system and method may include other devices as well. By way of example only, instead of a set top box, the client device may be a cellphone, tablet or personal computer. Moreover, the components may be integrated into a television, wherein video output 165 provides the video signals to a display disposed in the same housing as the components described above in connection with set top box 170. Indeed, devices in accordance with the systems and methods described herein may comprise any device capable of processing instructions and transmitting data to and from humans, directly or indirectly, including general purpose computers.

Server 110 may communicate with, or incorporate, a search engine 115. The search engine may return various types of data in response to various types of queries. For example, the query may include text or images. FIG. 1 illustrates a small portion of the types of data that the search engine may return in response to a query, such as website information (e.g., text displayed on the site, the URL, etc.), images 117 including reference images 118 and other images, and television schedule 119 (e.g., the title, description, dates, times, duration, channel and cable provider of a television show).

Figure 4:
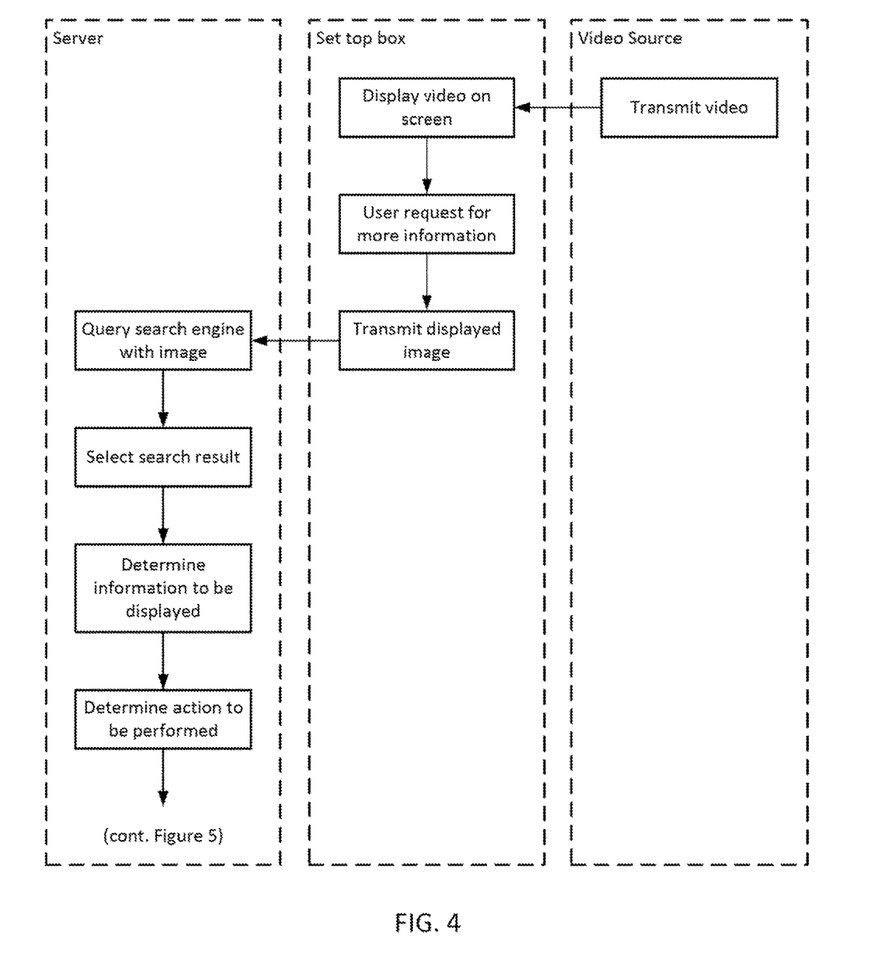
FIG. 4 is a flowchart of an illustrative process for obtaining information relating to video images in accordance with some implementations of the disclosed subject matter.
Figure 5:
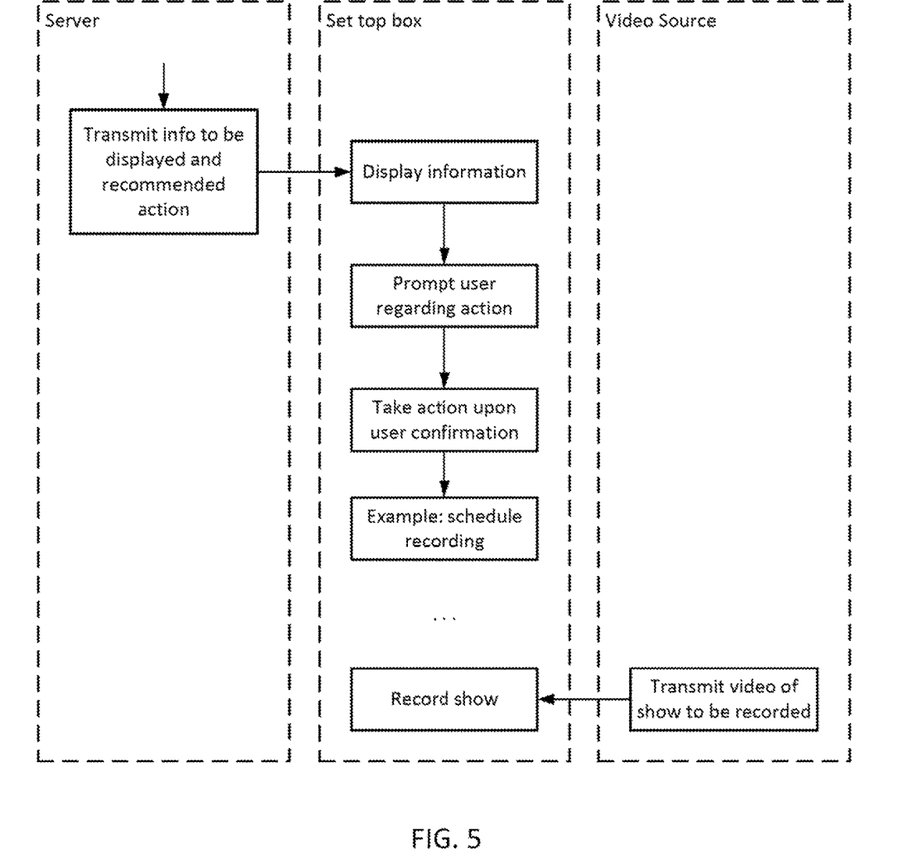
FIG. 5 is a flowchart of an illustrative process for obtaining information relating to video images that continues from FIG. 4 in accordance with some implementations of the disclosed subject matter.

In addition to the operations illustrated in FIGS. 4 and 5, operations in accordance with the system and method will now be described. Various operations can be handled in a different order or simultaneously, and each operation may be composed of other operations.

Images may be sent to the set top box for display to the end user. By way of example, video source 150 may stream sequential frames of video to set top box 170 via cable television network 196. Set top box 170, in turn, may perform any necessary decryption, conversion or other decoding and output a video signal to television 160. Television 160 may then display the images of the video in sequence to end user 199.

A user may indicate that there is something of interest to the user in a particular image or sequence of images being displayed. For instance, an end user 199 may want to know more about a movie or a product in a commercial that the user is watching. The user may indicate such interest by pressing button 164 on remote control 161 or any other suitable user interface to pause the video at the of interest. The user may also rewind or fast forward until the desired portion of the video is displayed. Once television 160 displays the image of interest to the user, the user may then press the button 163 on remote control 161, which sends a signal to the set top box indicating the user's interest.

Upon receiving the user's request for more information, the system and method may perform a search based on the image then being displayed to the user. By way of example, set top box 170 may transmit, to server 110, compressed bitmapped image data that captures the video frame shown on television 160 at the time the user pressed button 163. Server 110 may provide the image data to search engine 115 as a query.

The system and method may detect and recognize diverse objects in response to receiving a query in the form of an image (sometimes referred to herein as a "searched image"). For example, the system and method may use facial recognition to identify actors. The system and method may also use optical character recognition (OCR) to determine whether the colors of some of the image's individual pixels collectively have the characteristics of text, e.g., a processor may determine whether the image is displaying the name of a product or show. The system and method may further use image matching to identify products or other objects with similar shapes and colors to those captured in the image. Just some of the diverse objects that may be detected and recognized by server 110 and search engine 115 may include actors, scenes from movies, books, DVDs, landmarks, barcodes, QR codes, logos, contact information, artwork, stores and other businesses, consumer and other products, text and buildings, as well as any other entity constituting visual indicia that may be used to obtain additional information that is not contained within the image data received from the set top box.

Image matching may be used to recognize a variety of objects. For instance, training corpora may be used where each training corpus contains a set of objects. For each object, there may be one or more images (containing the visual appearance of that object) and some metadata of the object (e.g., type, name, etc.). These images may be used as reference images 118. For each image, descriptors for image interest points may be extracted and an image template built. A descriptor may include information extracted from local pixels around an interest point, such as a point in the image having a clear definition (e.g., is mathematically well-founded), having a well-defined position in image space, having a local image structure that is rich in terms of local information contents, and that is stable under local and global perturbations in the image domain. The template may include the extracted information of the image and a set of descriptors of all interest points in the image. Matching may be performed based on the image template, especially where the extracted information is more effective than raw image data when computing image similarity. Matching may be performed by a module having knowledge of the set of reference images (e.g., one or more training corpora). When given a searched image, the matcher retrieves and outputs reference images that are similar to the query. For each similar reference image, a match score may be provided to measure the similarity, which may be computed based on the number of matched descriptors. The matcher may also output the matched region and descriptors in both reference and searched images. The search results may include the reference image's metadata, which may be provided as a search result or used to obtain form a query and obtain other search results.

In that regard, a processor may search and return information that is based on, but not contained within, the image data received from the remote device. For instance, server 110 may recognize that an item in the image is a product and subsequently obtain information about the product that is inherent to the item (such as its size or ingredients) or not inherent to the item (such as a popular web page describing the product). Similarly, if the queried image is matched to a reference image of an actor, then in addition or in lieu of returning the matched image, search engine 115 may also return the actor's name and use the actor's name to obtain still more search results. Thus, the image data may be used to retrieve other types of data, e.g., textual descriptions of shows, products and actors.

The results returned by the search engine may be ranked based on a variety of factors. For instance, the results may be ranked based on the similarity of the search result to the query, such as how well a returned image matches the searched image. The results may also be ranked based on information that is not specific to the query, such as the popularity of one website in the search result relative to other websites.

The results may also be filtered or ranked based on the fact that the device providing the searched image is a set top box. For instance, if the search engine extracts text from a searched image and the text corresponds with the name of a television show, the search results might include a link to the most popular website for the show, images corresponding with the show, and the date and time that the show is scheduled to be broadcast. When ranking the results, the server may factor in the type of device making the request. For example, if the name of the show is received as part of query entered in a web browser running on unknown device, the search engine may weigh web sites more heavily than images and show times, e.g., the highest ranked search result may be a link to the most popular website for the show. However, if the name of the show was derived from an image known to be provided by a set top box, the search engine may rank the next scheduled showing higher than a link to the most popular web site. Similarly, the search engine may tend to rank images of actors higher than images of unknown individuals even if the image of the unknown individual is more visually similar to the searched image than the actor. In addition or alternatively, the system and method may append search terms to the query that are particular to video entertainment. By way of example, if the system determined that the searched image contained the word "taxi" and no other text, server 110 may include the word "show" in the query, e.g., it may query "taxi show." This can, for example, increase the chance that the top search result would refer to a show called Taxi instead of a list of taxi distributors. In that regard, the system and method permits the search engine to conduct more targeted searches when the searched image is received from a set top box instead of other devices.

The system and method may recommend actions for the set top box to take based on the search results. By way of example, if the searched image contained the name of a popular television show and the highest ranked search result is the next scheduled date and time that the show will be broadcast, server 110 may determine that the set top box should record the show the next time it is broadcast. On the other hand, if the searched image contained a picture of laundry detergent and the highest ranked search result is a product web site, the server may determine that the set top box should display the website to the user.

Figure 2:
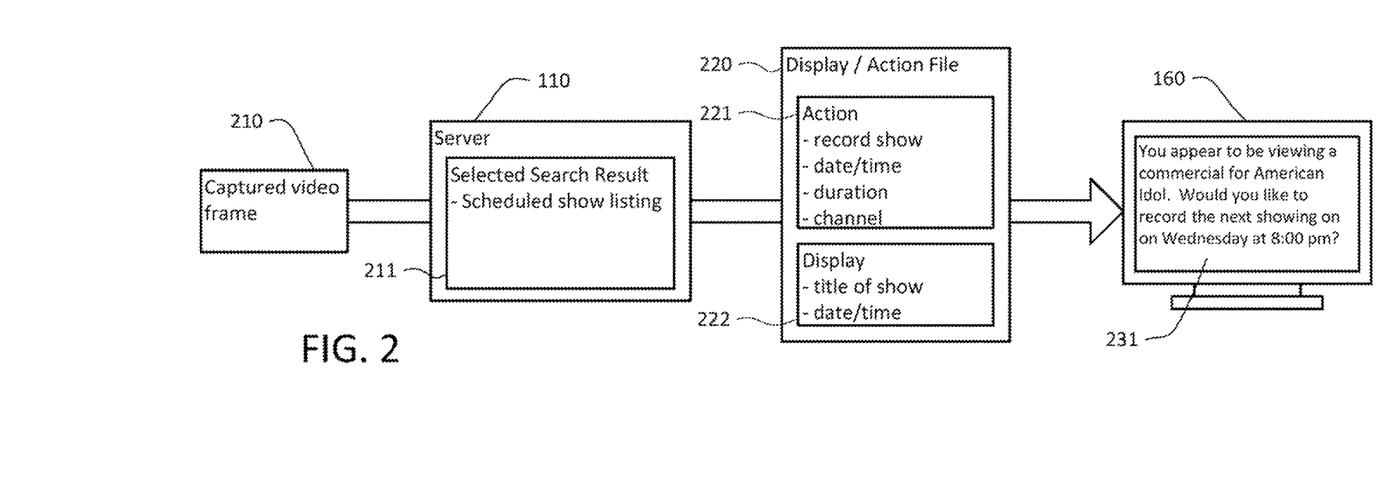
FIG. 2 is a diagram demonstrating an action that may be taken in response to receiving a captured video frame in accordance with some implementations of the disclosed subject matter.

As noted above, one of the actions may comprise recording a show. For example, and as shown in FIG. 2, in response to performing a query based on captured video frame 210, the highest ranked search result 210 may be a listing 211 taken from a television schedule, e.g., a television show. In response, server 110 may determine that the set top box should display information 221 such as the show's title and the date/time of its next airing. It may also recommend that the set top box perform an action 222 beyond the information to be displayed. By way of example, the server may instruct the set top box to record the show. If necessary, the server may also provide other information to the set top box to accomplish the task, such as specific recording instructions.

The information to be displayed to the user, as well as the action to be performed, may be provided to the set top box as a structured data. By way of example only, the server may transmit an XML data file 220 that includes the information to be displayed to the user in one node (e.g., its title and the date/time of its next airing in plain text) and instructions for recording the show in another node (e.g., channel, date, starting time, duration, etc.).

In response, the set top box may display the server's recommendation to the end user, e.g., the set top box may display message 231 on television 170 and await the user's instructions. If the user confirms that the show should be recorded, such as by pressing a particular button on the remote control, the set top box 170 may add the show to its schedule of recordings. Upon receiving the user's choice, the set top box may then resume displaying the video that was interrupted by the user's request for more information.

Figure 3:
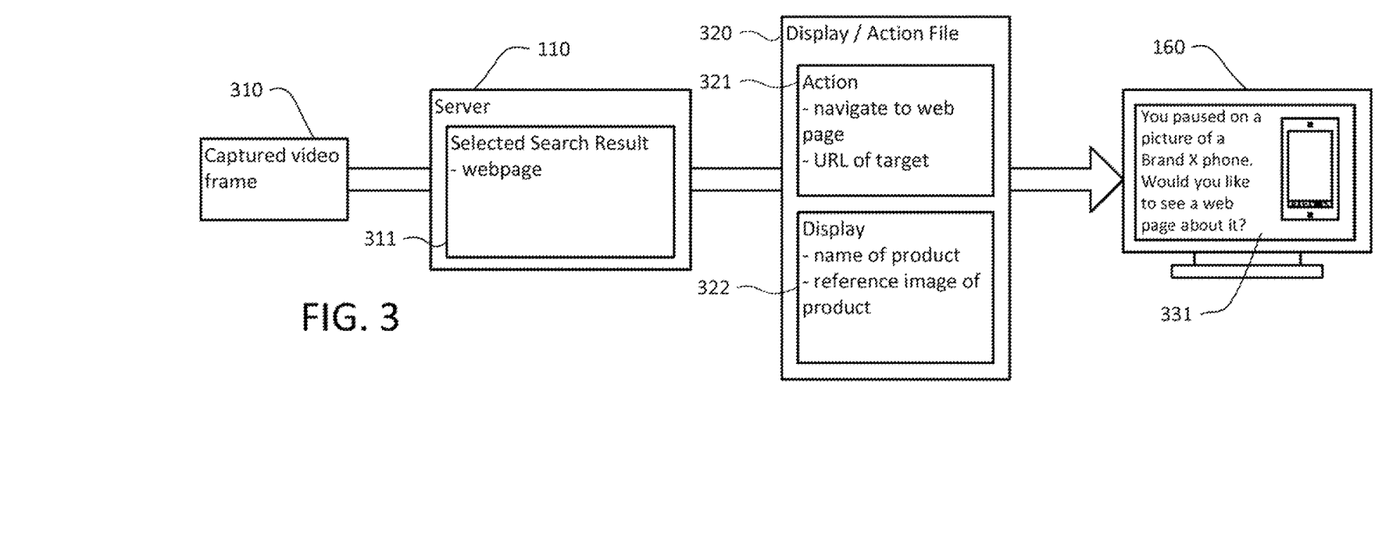
FIG. 3 is a diagram demonstrating another action that may be taken in response to receiving a captured video frame in accordance with some implementations of the disclosed subject matter.

Another one of the actions may comprise providing information about a product. For example, and as shown in FIG. 3, server 110 may have matched an object in the captured video frame 310 with a reference image of a product. After performing a query based on the product's name, the highest ranked search result 311 may have been a website related to the product. In response, the display node 322 of the display/action file 320 sent by server 110 to server 170 may include the name of the product and the reference image of the product. The action node 321 of the file may indicate that the set top box should download and display the information at the webpage, and provide the URL of the relevant page. (In one aspect, the server's provision of a URL without separately identifying a specific action may be interpreted as an instruction to download and display the information at the webpage.)

In response to receiving the display/action instructions, the set top box may display the server's recommendation to the end user, e.g., the information 331 displayed by television 170 may include the product name and picture. If the user confirms that the user would like to see the webpage, set top box 170 may (as shown in FIG. 1) access the webpage by directly downloading it from the applicable website 199 via network 195, or obtaining the website via server 110. Upon receiving the webpage, the set top box may then display it on television 170. In some aspects, the system and method may perform actions without waiting for user confirmation.

In that regard, the set top box may permit a user to obtain additional information about products shown on the screen without transmitting product-specific information (e.g., a UPC code or the like) to the server.

If the searched image includes an image of an actor, the system and method may take yet another action. For instance, server 110 may identify the name of an actor based on facial recognition. In response, the server may send a picture of the actor and a list of upcoming shows in which the actor will appear to the set top box for display to the user, and recommend that the set top box ask the user if he or she would like to record any of the shows.

Different types of search results and actions can be retrieved and recommended in response to a single image. By way of example, the server may detect and recognize that the frame includes both the face of an actor and the name of a movie. Based on the name of the movie, the display/action file may contain information about the movie, the start times of local theaters that are showing the movie, and a link to the website that ranked the highest in response to a query including the movie's name. Based on the actor's name, the display/action file may include a list of upcoming shows in which the actor will appear and a suggestion to record those shows. In response, the set top box may display all of the information and ask the user what the user would like to do, e.g., navigate to the movie's website, purchase tickets to the local theatre for one of the displayed start times, record one of the shows, etc.

In one aspect, the set top box may request information based not only on the user's selected image, but the images that were displayed shortly before or after the selected image. By way of example, if the set top box maintains a buffer that permits the user to rewind the video currently being displayed, the set top box may transmit the current frame as well as some of the frames in the buffer. The set top box may also transmit some subsequent frames from the video feed, e.g., the five frames before and after the paused frame. The transmission of multiple frames may permit the server to use and compare information from multiple frames to identify the object(s) in an image that are likely to be of greatest interest to the user. The transmission of multiple frames may also be conditional, e.g., a single frame is transmitted if the video was paused when the user requested more information, but multiple frames are transmitted if the video was playing when the user requested more information.

In some aspects, the set top box may identify, to the server, the searched image without transmitting the image data itself. For instance, when the user presses button 163, the set top box may send an identification of the specific frame to server 110 without sending pixel information, e.g., the set top box may transmit the time at which the frame was displayed, or the frame number, and an identification of the video (e.g., the name of the movie). Upon receiving the request, server 110 may access a copy of the video (e.g., from its own memory or by sending a request to video source 150), extract the image data associated with that frame, perform a search based on the image data, and transmit the results back to set top box 170.

As noted above, various elements of the system and method can be split between the set top box and computers in communication with the set top box. By way of example, the set top box 170 may be capable of recognizing show and movie titles without assistance of the server. Based on the resources available to set top box 170, the processor may also perform object detection and recognition of a subset of the object types that the server is capable of detecting and recognizing. For example, the processor may detect objects, extract visual characteristics relating to the objects it finds, and send those characteristics to server 110 for recognition. In that regard, the image data sent by the set top box may be more compressed and object-specific than sending the entire image.

Moreover, the set top box may receive additional instructions that permit the device to process more image data. For example, the set top box may download applications or modules that permit the set top box to detect and recognize additional objects. Downloaded applications may also include applications that perform new actions that may be sent by the server. In that regard, if the set top box receives an action that it does not recognize, it may request, receive and install an application from the server that is capable performing the action.

It will be further understood that the sample values, types and configurations of data described and shown in the figures are for the purposes of illustration only. In that regard, systems and methods in accordance with aspects of the invention may include various types of sensors, communication devices, user interfaces, vehicle control systems, data values, data types and configurations. The systems and methods may be provided and received at different times (e.g., via different servers or databases) and by different entities (e.g., some values may be pre-suggested or provided from different sources).

As these and other variations and combinations of the features discussed above can be utilized without departing from the systems and methods as defined by the claims, the foregoing description of exemplary implementations should be taken by way of illustration rather than by way of limitation of the invention as defined by the claims. It will also be understood that the provision of examples of the invention (as well as clauses phrased as "such as," "e.g.", "including" and the like) should not be interpreted as limiting the invention to the specific examples; rather, the examples are intended to illustrate only some of many possible aspects. Unless expressly stated to the contrary, every feature in a given implementation, alternative or example may be used in any other implementation, alternative or example herein.

What is claimed is:

1. A method for presenting supplemental content, the method comprising:
receiving, using a hardware processor, a request regarding an item of interest that was presented in a media content item;
obtaining, using the hardware processor, a plurality of image data including a video frame of the media content item corresponding to a time of the received request and at least one of a preceding video frame presented before the video frame and a subsequent frame presented after the video frame;

comparing, using the hardware processor, the plurality of image data to identify the item of interest;

identifying, using the hardware processor, supplemental content that is associated with the item of interest by performing a search with a search query based on the item of interest and receiving supplemental content as search results responsive to the search query;

transmitting, using the hardware processor, a response to the request that includes the supplemental content corresponding to the item of interest identified in the media content item; and causing, based on the transmitted response to the request, a computing device to present the supplemental content corresponding to the item of interest identified in the media content item and perform an action on the computing device in connection with the supplemental content.

2. The method of claim 1, wherein the supplemental content includes a second media content item that is different than the media content item and wherein the method further comprises:

identifying first data relating to the item of interest based on visual characteristics of the determined item of interest, wherein the first data comprises information relating to the second media content item; and determining a message to be displayed based on the first data and an action to be performed on the second media content item based on the first data.

3. The method of claim 2, wherein transmitting the response further comprises transmitting structured data that comprises a first node that includes information relating to displaying the message and a second node that includes instructions for performing the action by the computing device, wherein the transmitted structured data causes the computing device to display the message relating to the second media content item and perform the action on the second media content item.

4. The method of claim 3, wherein the action comprises displaying a webpage related to the item of interest and wherein the structured data includes a URL of the webpage.

5. The method of claim 2, wherein the visual characteristics of the item of interest in the first media content item are similar to the visual characteristics of an object appearing in the second media content item.

6. The method of claim 2, wherein the visual characteristics comprise text captured in the video frame of the media content item, wherein identifying the first data comprises using character recognition to identify the characters of the text, and wherein the first data is retrieved based on a query including the characters.

7. The method of claim 2, wherein identifying the first data comprises identifying other images that are visually similar to the plurality of image data, wherein the other images are associated with metadata, and wherein the first data is retrieved based on the metadata.

8. The method of claim 2, wherein the first data is used to form the search query that is performed on the item of interest to identify the supplemental content and wherein the action is determined based on a type of search result responsive to the search query.

9. A system for presenting supplemental content, the system comprising:

a hardware processor that:

receives a request regarding an item of interest that was presented in a media content item;

obtains a plurality of image data including a video frame of the media content item corresponding to a time of the received request and at least one of a preceding video frame presented before the video frame and a subsequent frame presented after the video frame;

compares the plurality of image data to identify the item of interest;

identifies supplemental content that is associated with the item of interest by performing a search with a search query based on the item of interest and receiving supplemental content as search results responsive to the search query;

transmits a response to the request that includes the supplemental content corresponding to the item of interest identified in the media content item; and causes, based on the transmitted response to the request, a computing device to present the supplemental content corresponding to the item of interest identified in the media content item and perform an action on the computing device in connection with the supplemental content.

10. The system of claim 9, wherein the supplemental content includes a second media content item that is different than the media content item and wherein the hardware processor is further configured to:

identify first data relating to the item of interest based on visual characteristics of the determined item of interest, wherein the first data comprises information relating to the second media content item; and determine a message to be displayed based on the first data and an action to be performed on the second media content item based on the first data.

11. The system of claim 10, wherein the hardware processor is further configured to transmit the response further comprises transmitting structured data that comprises a first node that includes information relating to displaying the message and a second node that includes instructions for performing the action by the computing device, wherein the transmitted structured data causes the computing device to display the message relating to the second media content item and perform the action on the second media content item.

12. The system of claim 11, wherein the action comprises displaying a webpage related to the item of interest and wherein the structured data includes a URL of the webpage.

13. The system of claim 10, wherein the visual characteristics of the item of interest in the first media content item are similar to the visual characteristics of an object appearing in the second media content item.

14. The system of claim 10, wherein the visual characteristics comprise text captured in the video frame of the media content item, wherein identifying the first data comprises using character recognition to identify the characters of the text, and wherein the first data is retrieved based on a query including the characters.

15. The system of claim 10, wherein identifying the first data comprises identifying other images that are visually similar to the plurality of image data, wherein the other images are associated with metadata, and wherein the first data is retrieved based on the metadata.

16. The system of claim 10, wherein the first data is used to form the search query that is performed on the item of interest to identify the supplemental content and wherein the action is determined based on a type of search result responsive to the search query.

17. A non-transitory computer-readable medium containing computer-executable instructions that, when executed by a hardware processor, cause the hardware processor to perform a method for presenting supplemental content, the method comprising:
- receiving a request regarding an item of interest that was presented in a media content item;
- obtaining a plurality of image data including a video frame of the media content item corresponding to a time of the received request and at least one of a preceding video frame presented before the video frame and a subsequent frame presented after the video frame;
- comparing the plurality of image data to identify the item of interest;
- identifying supplemental content that is associated with the item of interest by performing a search with a search query based on the item of interest and receiving supplemental content as search results responsive to the search query;
- transmitting a response to the request that includes the supplemental content corresponding to the item of interest identified in the media content item; and
- causing, based on the transmitted response to the request, a computing device to present the supplemental content corresponding to the item of interest identified in the media content item and perform an action on the computing device in connection with the supplemental content.

18. The non-transitory computer-readable medium of claim 17, wherein the supplemental content includes a second media content item that is different than the media content item and wherein the method further comprises:
- identifying first data relating to the item of interest based on visual characteristics of the determined item of interest, wherein the first data comprises information relating to the second media content item; and
- determining a message to be displayed based on the first data and an action to be performed on the second media content item based on the first data.

19. The non-transitory computer-readable medium of claim 18, wherein transmitting the response further comprises transmitting structured data that comprises a first node that includes information relating to displaying the message and a second node that includes instructions for performing the action by the computing device, wherein the transmitted structured data causes the computing device to display the message relating to the second media content item and perform the action on the second media content item.

20. The non-transitory computer-readable medium of claim 19, wherein the action comprises displaying a webpage related to the item of interest and wherein the structured data includes a URL of the webpage.

21. The non-transitory computer-readable medium of claim 18, wherein the visual characteristics of the item of interest in the first media content item are similar to the visual characteristics of an object appearing in the second media content item.

22. The non-transitory computer-readable medium of claim 18, wherein the visual characteristics comprise text captured in the video frame of the media content item, wherein identifying the first data comprises using character recognition to identify the characters of the text, and wherein the first data is retrieved based on a query including the characters.

23. The non-transitory computer-readable medium of claim 18, wherein identifying the first data comprises identifying other images that are visually similar to the plurality of image data, wherein the other images are associated with metadata, and wherein the first data is retrieved based on the metadata.

24. The non-transitory computer-readable medium of claim 18, wherein the first data is used to form the search query that is performed on the item of interest to identify the supplemental content and wherein the action is determined based on a type of search result responsive to the search query.

* * * * *